United States Patent
Ono et al.

(10) Patent No.: US 11,539,222 B2
(45) Date of Patent: *Dec. 27, 2022

(54) BATTERY CONTROL UNIT AND BATTERY SYSTEM

(71) Applicant: YAZAKI CORPORATION, Tokyo (JP)

(72) Inventors: Chihiro Ono, Susono (JP); Takahiro Syouda, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 135 days.

This patent is subject to a terminal disclaimer.

(21) Appl. No.: 16/808,370

(22) Filed: Mar. 4, 2020

(65) Prior Publication Data

US 2020/0321789 A1 Oct. 8, 2020

(30) Foreign Application Priority Data

Apr. 4, 2019 (JP) .............................. JP2019-072039

(51) Int. Cl.
*H02J 7/00* (2006.01)

(52) U.S. Cl.
CPC .......... *H02J 7/0019* (2013.01); *H02J 7/0016* (2013.01); *H02J 7/0049* (2020.01); *H02J 7/007182* (2020.01)

(58) Field of Classification Search
CPC ...... H02J 7/0019; H02J 7/0016; H02J 7/0049; H02J 7/007182

(Continued)

(56) References Cited

U.S. PATENT DOCUMENTS

| 4,313,080 A * | 1/1982 | Park | B60L 53/11 |
| | | | 180/65.225 |
| 5,270,635 A * | 12/1993 | Hoffman | H02J 7/022 |
| | | | 320/140 |

(Continued)

FOREIGN PATENT DOCUMENTS

| CN | 107683554 A * | 2/2018 | H01M 10/44 |
| EP | 0982830 A2 * | 3/2000 | H02J 7/0024 |

(Continued)

OTHER PUBLICATIONS

JPO Notice of Reasons for refusal of JP App 2019072039 added Feb. 8, 2022, https://register.epo.org/documentView?number=JP.2019072039.A&documentId=Notice_of_Reasons_for_Refusal_06122055125 (Year: 2022).*

(Continued)

*Primary Examiner* — John T Trischler
(74) *Attorney, Agent, or Firm* — Kenealy Vaidya LLP

(57) ABSTRACT

A switching unit is provided for each of a plurality of batteries arranged in series, and switches between a connected state where the corresponding battery is connected in series with another battery and a non-connected state where series connection between the corresponding battery and the other battery is disconnected. A control unit controls the switching unit corresponding to the battery to switch to the non-connected state when it is determined that the corresponding battery reaches a charge end voltage during charging or a discharge end voltage during discharging, and determinates deterioration of the batteries. Further, the control unit changes the charge end voltage or the discharge end voltage for each of the plurality of batteries in accordance with a deterioration state of the plurality of batteries.

4 Claims, 4 Drawing Sheets

(58) Field of Classification Search
USPC .......................................................... 320/132
See application file for complete search history.

(56) References Cited

U.S. PATENT DOCUMENTS

| | | | |
|---|---|---|---|
| 5,939,861 A | 8/1999 | Joko et al. | |
| 6,420,852 B1* | 7/2002 | Sato | H01M 10/46 320/134 |
| 8,288,992 B2* | 10/2012 | Kramer | H02J 7/0016 320/119 |
| 8,470,464 B2* | 6/2013 | Troutman | H01M 10/425 429/61 |
| 8,564,247 B2* | 10/2013 | Hintz | H02J 7/0016 320/119 |
| 8,796,993 B2* | 8/2014 | White | G01R 31/3648 320/119 |
| 8,798,832 B2* | 8/2014 | Kawahara | B60L 58/13 701/22 |
| 8,866,446 B2* | 10/2014 | Furuta | G01R 31/367 320/136 |
| 8,928,282 B2* | 1/2015 | Kudo | H01M 10/425 320/118 |
| 8,988,045 B2* | 3/2015 | Klein | H02J 7/007194 320/155 |
| 9,024,586 B2* | 5/2015 | Vance | B60L 58/22 320/122 |
| 9,054,533 B2* | 6/2015 | Gaul | H01M 10/441 |
| 9,093,864 B2* | 7/2015 | Abe | H02J 13/00017 |
| 9,153,845 B2* | 10/2015 | Tanaka | B60L 50/64 |
| 9,197,081 B2* | 11/2015 | Finberg | H02J 7/0021 |
| 9,395,420 B2* | 7/2016 | White | G01R 31/392 |
| 9,520,613 B2* | 12/2016 | Brockerhoff | H01M 10/441 |
| 9,564,763 B2* | 2/2017 | Finberg | H02J 7/0021 |
| 9,579,961 B2* | 2/2017 | Harris | B60L 53/80 |
| 9,669,726 B2* | 6/2017 | Luo | H02J 7/04 |
| 9,960,611 B2* | 5/2018 | Toya | H02J 7/0048 |
| 10,069,313 B2* | 9/2018 | Tkachenko | H01M 10/441 |
| 10,073,128 B2* | 9/2018 | Yoshioka | B60L 3/04 |
| 10,147,983 B2* | 12/2018 | Kawahara | H01M 10/482 |
| 10,222,428 B2* | 3/2019 | Saint-Marcoux | B60L 58/14 |
| 10,232,716 B2* | 3/2019 | Higuchi | H02M 1/32 |
| 10,256,643 B2* | 4/2019 | Toya | H02J 7/0016 |
| 10,330,732 B2* | 6/2019 | Roumi | G01R 31/392 |
| 10,483,791 B2* | 11/2019 | Mergener | H02J 7/0049 |
| 10,543,303 B2* | 1/2020 | Zilbershlag | A61M 60/148 |
| 10,561,775 B2* | 2/2020 | Zilbershlag | H02J 7/0026 |
| 10,833,512 B2* | 11/2020 | Remboski | H02J 7/00302 |
| 10,958,075 B2* | 3/2021 | Collins | H02J 4/00 |
| 10,958,083 B2* | 3/2021 | Halsey | H01M 50/20 |
| 10,985,552 B2* | 4/2021 | Tada | H02J 7/0026 |
| 10,985,587 B2* | 4/2021 | Matsumura | H02J 7/007 |
| 10,992,146 B2* | 4/2021 | Flowers | H02J 7/00041 |
| 11,005,276 B2* | 5/2021 | Lee | B60L 58/21 |
| 11,095,148 B2* | 8/2021 | Mergener | H02J 7/0063 |
| 11,128,153 B1* | 9/2021 | Cho | H02J 7/007184 |
| 11,277,012 B2* | 3/2022 | Ono | H01M 10/425 |
| 2002/0070707 A1* | 6/2002 | Sato | H02J 7/0014 320/134 |
| 2002/0109506 A1* | 8/2002 | Kawakami | G01R 31/392 324/522 |
| 2003/0169017 A1* | 9/2003 | Ariga | H02J 7/0071 320/125 |
| 2004/0008031 A1* | 1/2004 | Arai | H01M 10/48 324/429 |
| 2009/0066291 A1* | 3/2009 | Tien | H02J 7/0016 320/118 |
| 2009/0078481 A1* | 3/2009 | Harris | B60L 53/80 180/65.1 |
| 2009/0167247 A1* | 7/2009 | Bai | H02J 7/0016 320/134 |
| 2009/0251100 A1* | 10/2009 | Incledon | H02J 7/0026 320/137 |
| 2009/0295332 A1* | 12/2009 | Yang | H02J 7/00306 320/132 |
| 2010/0244781 A1* | 9/2010 | Kramer | H02J 7/0016 320/162 |
| 2010/0305792 A1* | 12/2010 | Wilk | B60L 50/61 701/22 |
| 2011/0057617 A1* | 3/2011 | Finberg | H02J 7/0021 320/118 |
| 2011/0078470 A1* | 3/2011 | Wang | G06F 1/28 713/320 |
| 2011/0089897 A1* | 4/2011 | Zhang | H02J 7/0018 320/116 |
| 2011/0169454 A1* | 7/2011 | Maruyama | H01M 10/482 320/118 |
| 2011/0260687 A1* | 10/2011 | Kudo | H01M 10/425 320/118 |
| 2011/0313613 A1 | 12/2011 | Kawahara et al. | |
| 2012/0013304 A1* | 1/2012 | Murase | H01M 50/502 320/116 |
| 2012/0074898 A1* | 3/2012 | Schwartz | H02J 7/0016 320/107 |
| 2012/0086403 A1* | 4/2012 | Furuta | H02J 7/0013 320/118 |
| 2012/0091964 A1* | 4/2012 | Vance | H01M 10/441 320/122 |
| 2012/0094150 A1* | 4/2012 | Troutman | G01R 31/396 429/50 |
| 2012/0206105 A1* | 8/2012 | Nishizawa | H01M 10/482 320/134 |
| 2013/0026993 A1* | 1/2013 | Hintz | H02J 7/0016 320/119 |
| 2013/0065093 A1* | 3/2013 | White | H01M 10/42 429/50 |
| 2013/0069598 A1* | 3/2013 | Tanaka | B60L 50/64 320/134 |
| 2014/0021924 A1* | 1/2014 | Abe | H01M 10/48 320/118 |
| 2014/0167780 A1* | 6/2014 | White | H01M 10/42 324/538 |
| 2015/0028817 A1* | 1/2015 | Brockerhoff | B60L 58/19 320/137 |
| 2015/0291050 A1 | 10/2015 | Luo et al. | |
| 2015/0367744 A1* | 12/2015 | Saint-Marcoux | B60L 58/15 320/162 |
| 2015/0380959 A1* | 12/2015 | Chang | H02J 7/0016 320/118 |
| 2016/0043579 A1* | 2/2016 | Finberg | H02J 7/0021 320/116 |
| 2016/0351976 A1* | 12/2016 | Kawahara | G01R 31/3842 |
| 2017/0104347 A1* | 4/2017 | Shimonishi | H01M 4/387 |
| 2017/0117721 A1* | 4/2017 | Toya | H02J 7/005 |
| 2017/0264110 A1* | 9/2017 | Toya | H02J 7/0021 |
| 2017/0299660 A1* | 10/2017 | Saint-Marcoux | B60L 50/51 |
| 2017/0346334 A1* | 11/2017 | Mergener | H02J 9/06 |
| 2018/0008760 A1* | 1/2018 | Zilbershlag | H01M 10/4207 |
| 2018/0056798 A1* | 3/2018 | Syouda | B60L 53/11 |
| 2018/0062402 A1* | 3/2018 | Syouda | H02J 7/0019 |
| 2018/0219390 A1* | 8/2018 | Tkachenko | H01M 10/425 |
| 2018/0241227 A1* | 8/2018 | Halsey | H01M 10/482 |
| 2018/0339093 A1* | 11/2018 | Zilbershlag | A61N 1/378 |
| 2019/0103750 A1* | 4/2019 | Kristensen | H02J 7/0016 |
| 2019/0148952 A1* | 5/2019 | Remboski | H02J 7/00302 320/128 |
| 2019/0229540 A1* | 7/2019 | Lee | H02J 7/0024 |
| 2019/0273380 A1* | 9/2019 | Collins | H02M 7/49 |
| 2019/0299799 A1* | 10/2019 | Hinterberger | H02J 7/0025 |
| 2019/0393696 A1* | 12/2019 | Tada | H01H 37/5427 |
| 2020/0036047 A1* | 1/2020 | Aikens | H01M 50/572 |
| 2020/0044459 A1* | 2/2020 | Lee | H02J 7/0048 |
| 2020/0052524 A1* | 2/2020 | Mergener | H02J 7/0047 |
| 2020/0099110 A1* | 3/2020 | Lin | H02J 7/0019 |
| 2020/0203961 A1* | 6/2020 | Flowers | H02J 7/00304 |
| 2020/0244076 A1* | 7/2020 | Wang | H02M 7/53871 |
| 2020/0274203 A1* | 8/2020 | Kirleis | H02J 7/0016 |
| 2020/0274368 A1* | 8/2020 | Crouse, Jr. | H02J 4/00 |
| 2020/0274371 A1* | 8/2020 | Kirleis | H02J 7/0016 |
| 2020/0274386 A1* | 8/2020 | Kirleis | H02J 7/0063 |
| 2020/0321788 A1* | 10/2020 | Ono | H02J 7/0016 |
| 2020/0412159 A1* | 12/2020 | Snyder | H01M 10/482 |

(56) References Cited

U.S. PATENT DOCUMENTS

| | | | |
|---|---|---|---|
| 2021/0075230 A1* | 3/2021 | Ono | H02J 7/007182 |
| 2021/0098996 A1* | 4/2021 | Ono | H02J 7/007182 |
| 2021/0234380 A1* | 7/2021 | Ono | H02J 7/0013 |
| 2021/0249873 A1* | 8/2021 | Despesse | H02J 3/32 |
| 2021/0273461 A1* | 9/2021 | Lin | H02J 7/0016 |
| 2021/0296912 A1* | 9/2021 | Cho | H02J 7/007184 |

FOREIGN PATENT DOCUMENTS

| | | | | |
|---|---|---|---|---|
| EP | EP-2053414 A2 * | 4/2009 | | G01R 31/392 |
| JP | H10-14002 A | 1/1998 | | |
| JP | 2008-125158 A | 5/2008 | | |
| JP | 2009080093 A * | 4/2009 | | G01R 31/392 |
| JP | 2013-172551 A | 9/2013 | | |
| JP | 2013247003 A * | 12/2013 | | H02J 7/00 |
| JP | 2014-096958 A | 5/2014 | | |
| WO | 2010/109956 A1 | 9/2010 | | |

OTHER PUBLICATIONS

STIC 2800 search report, Steven Chung, dated Mar. 14, 2022 (Year: 2022).*

* cited by examiner

BATTERY CONTROL UNIT AND BATTERY SYSTEM

CROSS-REFERENCE TO RELATED APPLICATIONS

This application is based on and claims priority under 35 USC 119 from Japanese Patent Application No. 2019-072039 filed on Apr. 4, 2019, the contents of which are incorporated herein by reference.

TECHNICAL FIELD

The present invention relates to a battery control unit and a battery system.

BACKGROUND ART

There is a battery system configured by connecting a plurality of batteries in series as a battery mounted on a vehicle to supply electric power to a drive source or to supply electric power to an auxiliary machine. Deterioration of the plurality of batteries varies due to variations of manufacturing or variations of operating environments and so on. For example, a batten near a heat source is rapidly deteriorated, while a battery far from the heat source is slowly deteriorated.

For this reason, the battery that has deteriorated at the time of charging or discharging reaches a charge/discharge end voltage first. In this case, the charging or discharging may have to be stopped even if there is remaining power in the other batteries, thus capacity of the batteries cannot be entirely consumed.

Therefore, it is considered to equalize charging states of the plurality of batteries (Patent Literature 1). However, if all the batteries are set to the same charge/discharge end voltage, a burden of the battery that has deteriorated may increase, thereby resulting in a larger variation of deterioration.

CITATION LIST

Patent Literature

[Patent Literature 1] WO2010/109956

SUMMARY OF INVENTION

The present invention has been made in view of the above circumstances, and an object thereof is to provide a battery control unit and a battery system which can reduce variations of deterioration of a plurality of batteries.

In order to achieve the above object, a battery control unit and a battery system according to the present invention are characterized by the following [1] to [4].

[1]

A battery control unit includes: switching units provided for each of a plurality of batteries arranged in series, the switching units being configured to switch between a connected state where the corresponding batteries are connected in series with the other batteries and a non-connected state where series connection between the corresponding batteries and the other batteries are disconnected; and a control unit configured to control the switching units corresponding to the batteries to switch to the non-connected state when it is determined that the corresponding batteries reach a charge end voltage during charging or a discharge end voltage during discharging. The control unit changes the charge end voltage or the discharge end voltage for each of the plurality of batteries in accordance with a deterioration state of the plurality of batteries.

[2]

In the battery control unit according to [1], the control unit changes both the charge end voltage and the discharge end voltage for each of the plurality of batteries in accordance with the deterioration state of the plurality of batteries.

[3]

In the battery control unit according to [1] or [2], the control unit determines a charge deterioration state or a discharge deterioration state of the batteries and changes the charge end voltage or the discharge end voltage in accordance with the charge deterioration state or the discharge deterioration state.

[4]

A battery system includes: a plurality of batteries; and the battery control unit according to any one of [1] to [3].

According to the battery control unit and the battery system having the above configurations [1] and [4], a depth of discharge of the batteries can be changed in accordance with the deterioration state to restrain progress of deterioration, thus the variations of deterioration of the plurality of batteries can be restrained.

According to the battery control unit having the above configuration [2], by changing both the charge end voltage and the discharge end voltage, a range of variation of the range between the charge end voltage and the discharge end voltage can be increased, the deterioration of the deteriorated battery can be further restrained, and battery capacity of the batteries which are not deteriorated can be more effectively used.

According to the battery control unit having the above configuration [3], the deterioration state of the battery can be accurately determined by determining the charge deterioration state or the discharge deterioration state.

According to the present invention, a battery control unit and a battery system, which can change the depth of discharge according to the deteriorated state of battery to restrain the variation of deterioration of the plurality of batteries, can be provided.

The present invention has been briefly described above. Details of the present invention are further clarified by reading a mode for carrying out the present invention described below (hereinafter, referred to as "embodiment") with reference to the accompanying drawings.

DESCRIPTION OF EMBODIMENTS

A specific embodiment of the present invention will be described below with reference to the drawings.

Figure 1:
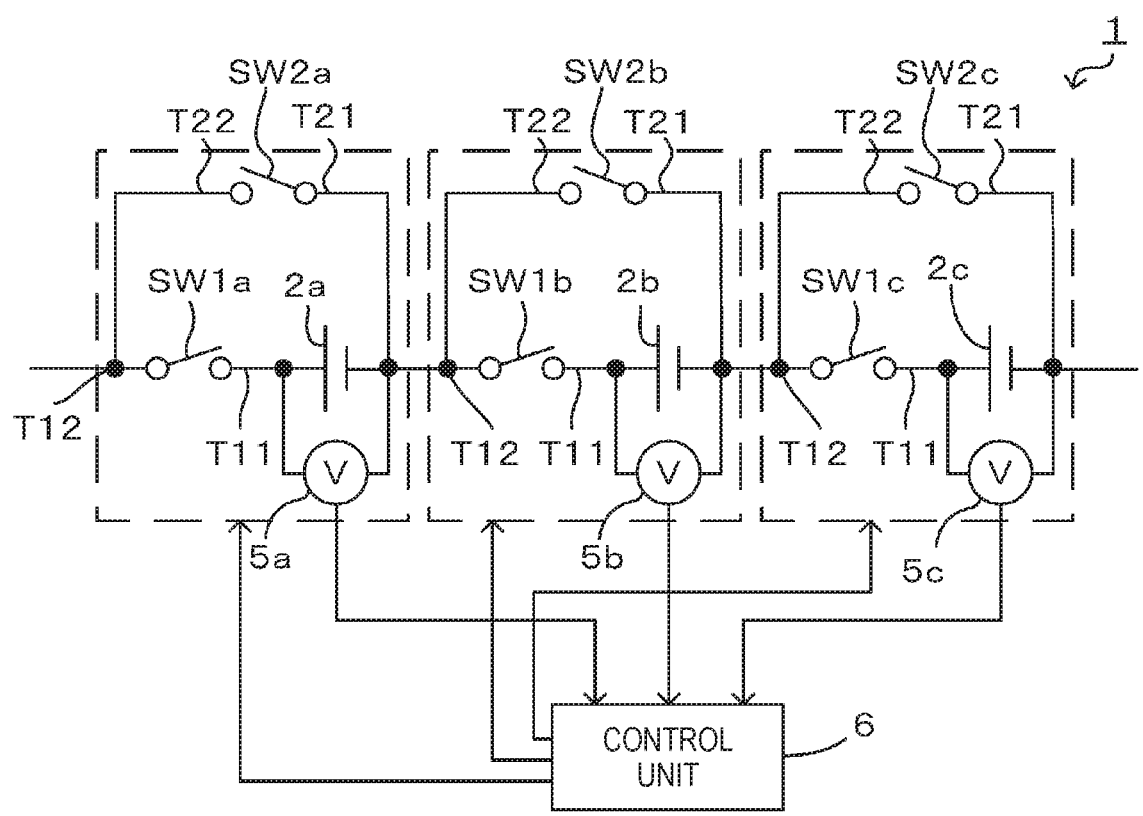
FIG. 1 is a circuit diagram showing a battery system according to the present invention.

A battery system shown in FIG. 1 is mounted on, for example, an EV or HEV vehicle that is driven by an electric motor and provides power source for the electric motor.

As shown in FIG. 1, a battery system 1 includes a plurality of batteries 2a to 2c and a battery control unit 3. Although an example in which the three batteries 2a to 2c are connected in series will be described in the present embodiment to simplify the description, the present invention is not limited thereto. The number of the batteries 2a to 2c may be two, or four or more as long as the number is plural. Each of the plurality of batteries 2a to 2c is a chargeable and dischargeable storage battery, and may be configured by one cell, or may be configured by a plurality of cells.

The battery control unit 3 includes a plurality of switching units 4a to 4c, a plurality of voltage measuring units 5a to 5c, and a control unit 6. The plurality of switching units 4a to 4c are provided corresponding to the plurality of batteries 2a to 2c, respectively. The plurality of switching units 4a to 4c have the same configuration.

The switching units 4a to 4c is able to switch between a connected state where the corresponding batteries 2a to 2c are connected in series to the other batteries 2a to 2c and a non-connected state where series connection between the corresponding batteries 2a to 2c and the other batteries 2a to 2c are disconnected. More specifically, the batteries 2a to 2c which are switched to the connected state by the switching units 4a to 4c are connected in series and used as a power source. On the other hand, the batteries 2a to 2c which are switched to the non-connected state by the switching units 4a to 4c are disconnected from the batteries 2a to 2c in the connected state and are not used as the power source.

The switching unit 4a includes a first switch SW1a which is connected in series to the battery 2a, and a second switch SW2a which is connected in parallel to the battery 2a and the first switch SW1a. One end T11 of the first switch SW1a is connected to one pole (for example, a positive pole) of the battery 2a. One end T21 of the second switch SW2a is connected to the other pole (for example, a negative pole) of the battery 2a, while the other end T22 thereof is connected to the other end T12 of the first switch SW1a. The switching units 4b, 4c can be described by replacing "a" in the above description of the switching unit 4a with "b" and "c", respectively, thus a detailed description thereof is omitted.

The other end T12 of the first switch SW1b is connected to a negative pole of the battery 2a, while the other end T12 of the first switch SW1c is connected to the negative pole of the battery 2b. That is, the first switches SW1b, SW1c are respectively connected between the adjacent batteries 2a and 2b and between the adjacent batteries 2b and 2c.

According to the above configuration, when the second switches SW2a to SW2c are turned off while the first switches SW1a to SW1c are turned on, the corresponding batteries 2a to 2c are in the connected state. When the first switches SW1a to SW1c are turned off, the corresponding batteries 2a to 2c are in the non-connected state. At this time, when the second switches SW2a to SW2c are turned on, a bypass path is formed, and only the batteries 2a to 2c which are in the connected state are connected in series.

The voltage measuring units 5a to 5c measure voltages at two ends of the corresponding batteries 2a to 2c and output measurement results thereof to the control unit 6 described below.

The control unit 6 is configured by known CPU, ROM, and RAM, and controls the entire battery system 1. The control unit 6 controls ON and OFF of the first switches SW1a to SW1c and the second switches SW2a to SW2c based on the voltages at the two ends of the batteries 2a to 2c.

Figure 2:
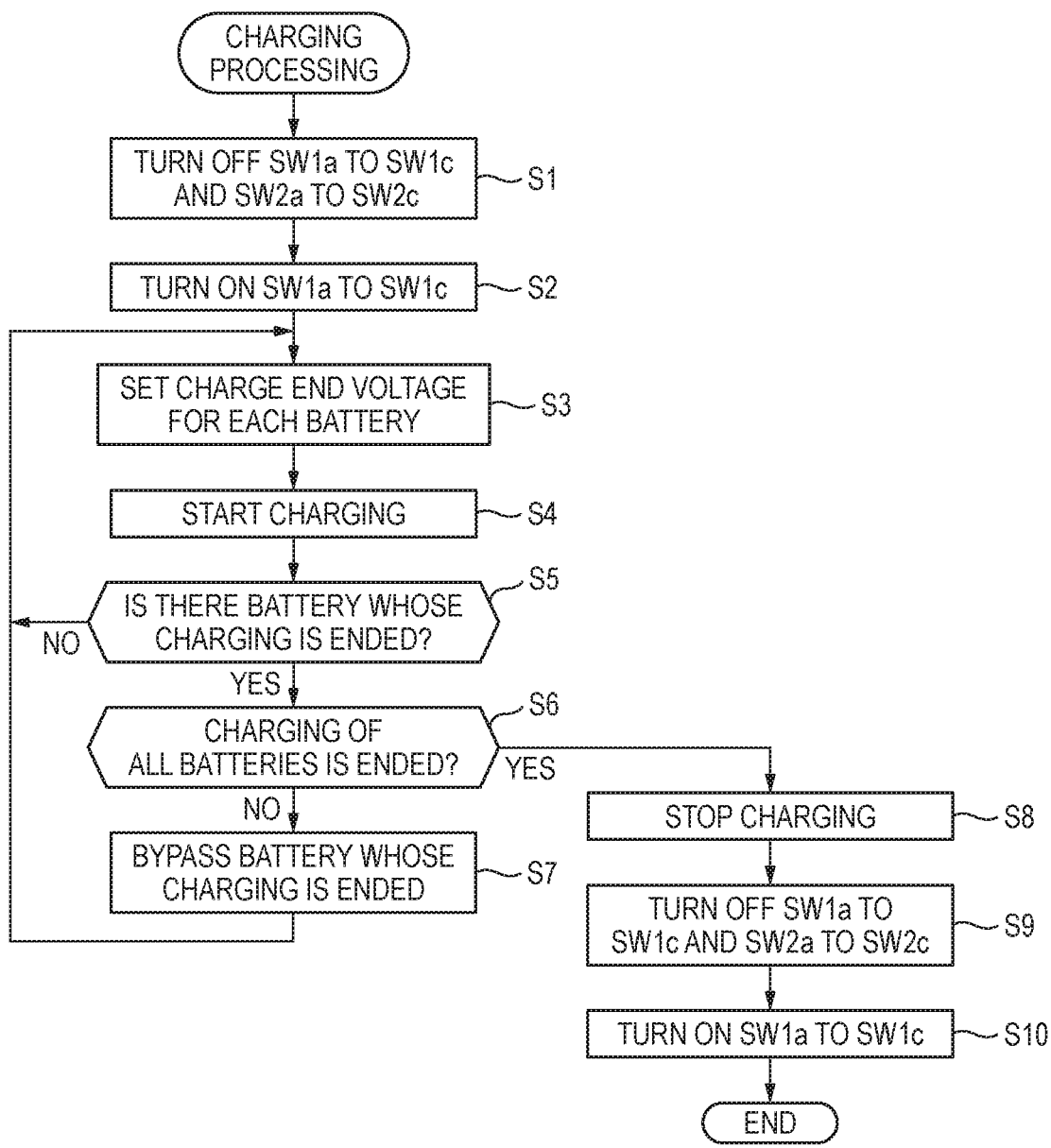
FIG. 2 is a flowchart showing a charging processing procedure of a control unit shown in FIG. 1.

Next, a charging operation of the battery system 1 configured as described above will be described with reference to FIGS. 2 and 4A-4D. FIG. 2 is a flowchart showing a charging processing procedure of the control unit 6 shown in FIG. 1. FIGS. 4A to 4D are explanatory diagrams which describe the charging processing procedure and a discharging processing procedure of the control unit 6 shown in FIG. 1.

The control unit 6 periodically executes determination processing which determines a deterioration state of each of the batteries 2a to 2c separately from charging processing and discharging processing described below. In the present embodiment, the control unit 6 separates deterioration states of the batteries 2a to 2c into the charge deterioration state (deterioration of a negative pole) and the discharge deterioration state (deterioration of a positive pole) and performs determination. As an example of determination of the charge deterioration state, it is considered to perform the determination based on a rate of increase of the voltages at the two ends of the batteries 2a to 2c during charging. As an example of determination of the discharge deterioration state, it is considered to perform the determination based on a rate of decrease of the voltages at the two ends of the batteries 2a to 2c during discharging.

Figure 4A:
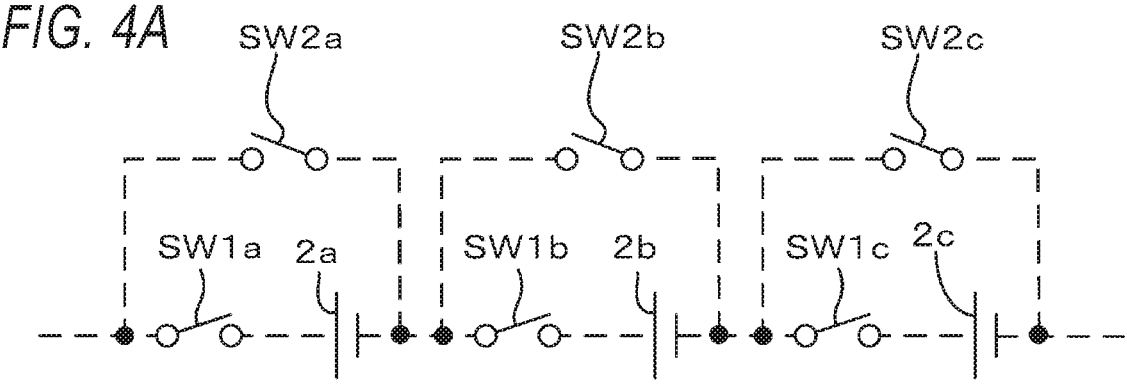
FIGS. 4A to 4D are explanatory diagrams which describe the charging processing procedure and the discharging processing procedure of the control unit shown in FIG. 1.
Figure 4B:
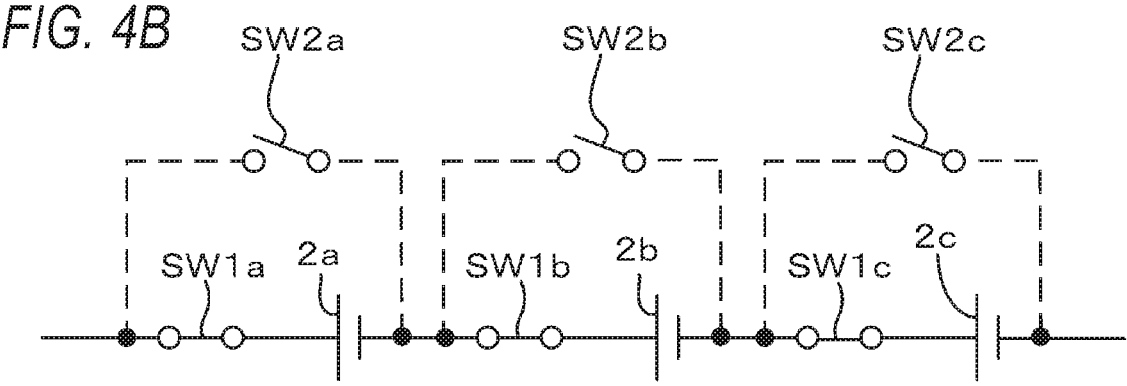
Figure 4C:
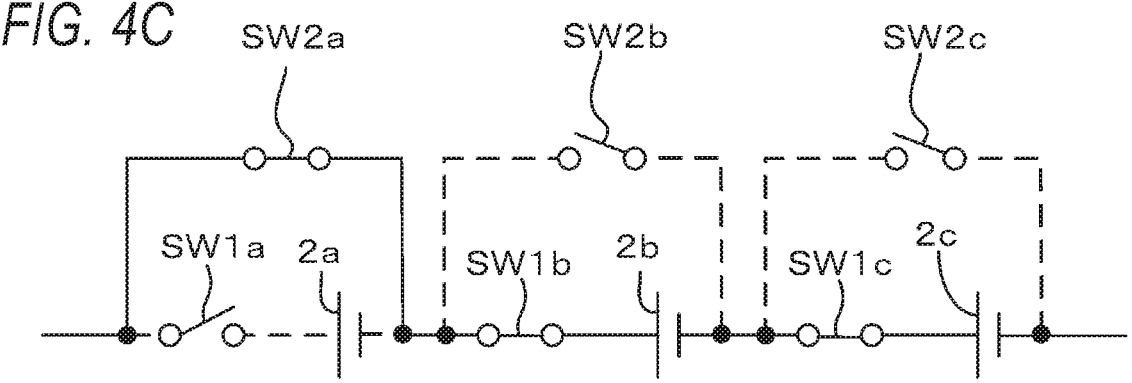
Figure 4D:
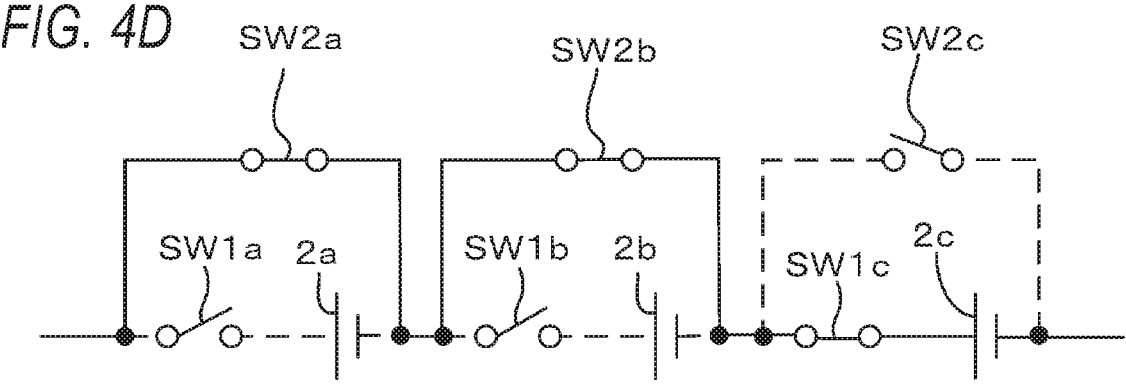

Upon receiving a charging command, the control unit 6 starts charging processing shown in FIG. 2. First, as shown in FIG. 4A, the control unit 6 turns off all the first switches SW1a to SW1c and all the second switches SW2a to SW2c (step S1). Thereafter, as shown in FIG. 4B, the control unit 6 turns on all the first switches SW1a to SW1c (step S2), and connects all the batteries 2a to 2c in series.

Next, the control unit 6 sets the charge end voltage in accordance with the charge deterioration state of the batteries 2a to 2c determined in the above determination processing (step S3). In the present embodiment, the control unit 6 sets the charge end voltage to a lower value for the batteries 2a to 2c which are charge-deteriorated. For example, in a case to be described, the charge deterioration state is determined into three stages (large, medium, and small), and the battery 2a is determined, by the above determination processing, to be "large", the battery 2b is determined to be "medium", and the battery 2c is determined to be "small" regarding the charge deterioration state. In this case, a charge end voltage Vca of the battery 2a (whose charge deterioration state is "large") is set to 4.0V. The charge end voltage Vcb of the battery 2b (whose charge deterioration state is "medium") is set to 4.1V, and the charge end voltage Vcc of the battery 2c (whose charge deterioration state is "small") is set to 4.2V.

Thereafter, the control unit 6 starts charging the batteries 2a to 2c (step S4). Next, the control unit 6 acquires the voltages at the two ends of the batteries 2a to 2c measured by the voltage measuring units 5a to 5c and compares the acquired charge end voltages Vca, Vcb, Vcc with the charge end voltage set in step S3 (step S5). As a result of the comparison, if no battery 2a to 2c reaches the charge end voltage Vca, Vcb, Vcc among the batteries 2a to 2c in the connected state (N in step S5), the control unit 6 returns to step S3.

On the other hand, if there is a battery 2a to 2c that has reached the charge end voltage set in step S3 (Y in step S5), the control unit 6 determines whether all the batteries 2a to 2c have reached the charge end voltage (step S6). If not all of the batteries 2a to 2c have reached the charge end voltage (N in step S6), the control unit 6 bypasses the batteries 2a to 2c which are determined to have reached the charge end voltage in step S6 (step S7).

More specifically, in step S7 the control unit 6 turns off the first switches SW1a to SW1c corresponding to the batteries 2a to 2c which have reached the charge end voltage, and turns on the second switches SW2a to SW2c corresponding to the batteries 2a to 2c which have reached the charge end voltage. As a result, the batteries 2a to 2c which are determined to have reached the charge end voltage are in the non-connected state. Thereafter, the control unit 6 returns to step S3.

On the other hand, when it is determined that all the batteries 2a to 2c have reached the charge end voltage (Y in step 6), the control unit 6 stops the charging (step S8). Thereafter, the control unit 6 turns off all the first switches SW1a to SW1c and all the second switches SW2a to SW2c (step S9), then turns on all the first switches SW1a to SW1c (step S10), and ends the processing.

A rate of increase of the voltages at the two ends during charging is higher for the batteries 2a to 2c which are deteriorated, and the charge end voltage thereof is reached soon even if the batteries 2a to 2c are charged with the same current. As described above, when the batteries are deteriorated in an order of 2c, 2b, 2a, the most deteriorated battery 2a reaches the charge end voltage Vca=4.0V first. Therefore, according to the above-described operation, the control unit 6 first turns off the first switch SW a corresponding to the battery 2a, turns on the second switch SW2a (FIG. 4C), and bypasses the battery 2a.

Next, the second deteriorated battery 2b reaches the charge end voltage Vcb=4.1 V. Therefore, according to the above-described operation, the control unit 6 turns off the first switch SW1b corresponding to the battery 2b next, turns on the second switch SW2b (FIG. 4D), and bypasses the battery 2b.

Thereafter, the battery 2c which is the least deteriorated reaches the charge end voltage Vcc=4.2 V. According to the above-described operation, the control unit 6 turns off all the switches SW1a to SW1c, SW2a to SW2c (FIG. 4A), and stops the charging.

Figure 3:
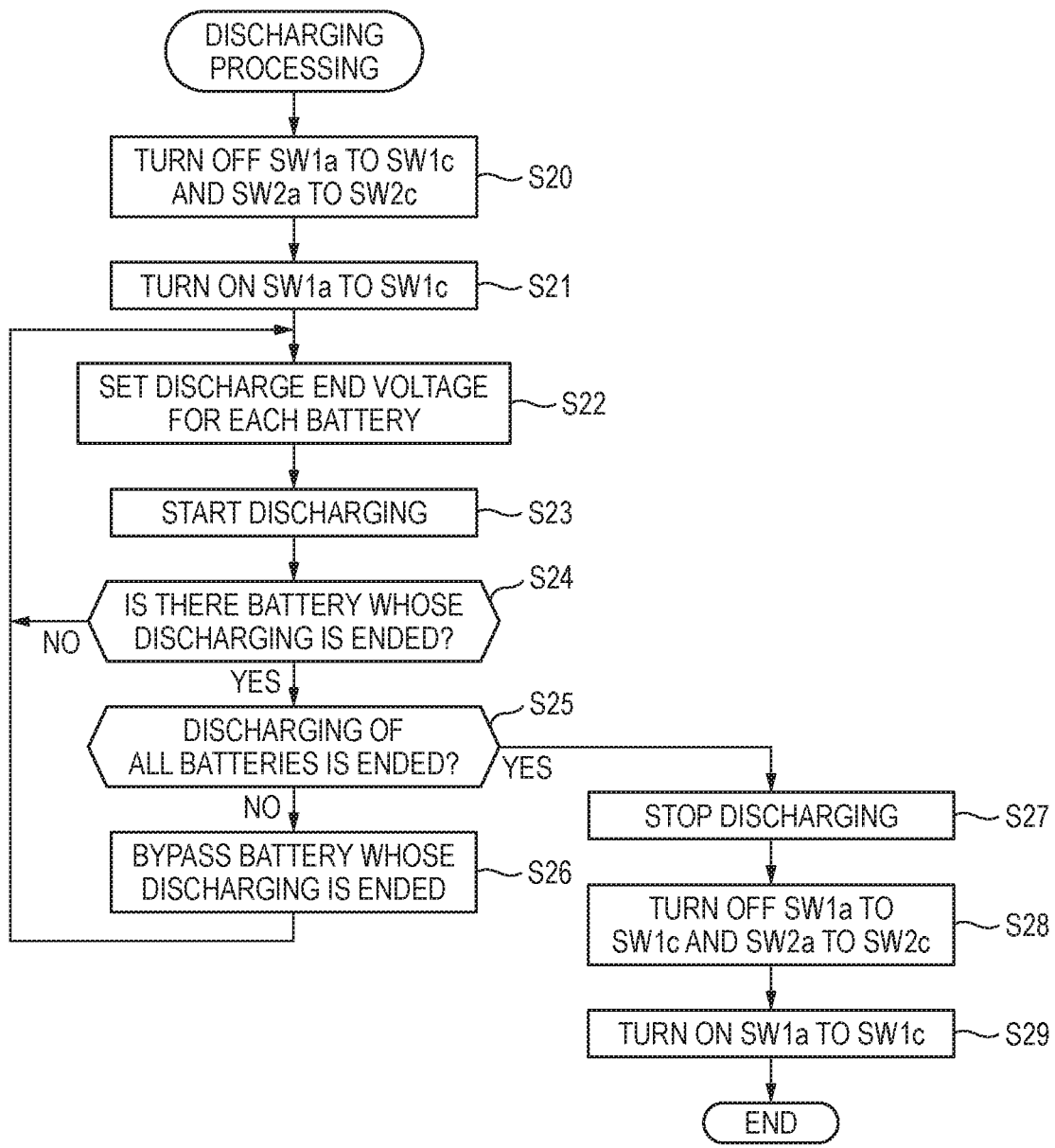
FIG. 3 is a flowchart showing a discharge processing procedure of the control unit shown in FIG. 1.

Next, a discharging operation of the battery system 1 configured as described above will be described with reference to FIGS. 3 and 4A to 4D. FIG. 3 is a flowchart showing a discharge processing procedure of the control unit 6 shown in FIG. 1.

Upon receiving a discharging command, the control unit 6 starts discharging processing shown in FIG. 3. Next, as shown in FIG. 4A, the control unit 6 turns off all the first switches SW1a to SW1c and all the second switches SW2a to SW2c (step S20). Thereafter, as shown in FIG. 4B, the control unit 6 turns on all the first switches SW1a to SW1c (step S21), and connects all the batteries 2a to 2c in series.

Next, the control unit 6 sets the discharge end voltage in accordance with the discharge deterioration state of the batteries 2a to 2c determined in the above determination processing (step S22). In the present embodiment, the control unit 6 sets the discharge end voltage to a lower value for the batteries 2a to 2c which are discharge-deteriorated. For example, in a case to be described, the discharge deterioration state is determined into three stages (large, medium, and small), and the battery 2a is determined, by the above determination processing, to be "large", the battery 2b is determined to be "medium", and the battery 2c is determined to be "small" regarding the discharge deterioration state. In this case, a discharge end voltage Vda of the battery 2a (whose discharge deterioration state is "large") is set to 2.8V. The discharge end voltage Vdb of the battery 2b (whose discharge deterioration state is "medium") is set to 2.7V, and the discharge end voltage Vdc of the battery 2c (whose discharge deterioration state is "small") is set to 2.6V.

Thereafter, the control unit 6 starts discharging the batteries 2a to 2c (step S23). Next, the control unit 6 acquires the voltages at the two ends of the batteries 2a to 2c measured by the voltage measuring units 5a to 5c and compares the acquired discharge end voltages Vda, Vdb, Vdc set in step S22 (step S24). As a result of the comparison, if no battery 2a to 2c reaches the discharge end voltage Vda, Vdb, Vdc among the batteries 2a to 2c in the connected state (N in step S24), the control unit 6 returns to step S22.

On the other hand, if there is a battery 2a to 2c that has reached the discharge end voltage set in step S22 (Y in step S24), the control unit 6 determines whether all the batteries 2a to 2c have reached the discharge end voltage (step S25). If not all of the batteries 2a to 2c have reached the discharge end voltage (N in step S25), the control unit 6 bypasses the batteries 2a to 2c, which are determined to have reached the discharge end voltage in step S24 (step S26).

More specifically, in step S26, the control unit 6 turns off the first switches SW1a to SW1c corresponding to the batteries 2a to 2c which have reached the discharge end voltage, and turns on the second switches SW2a to 2c corresponding to the batteries 2a to 2c which have reached the discharge end voltage. As a result, the batteries 2a to 2c which are determined to have reached the discharge end voltage are in the non-connected state. Thereafter, the control unit 6 returns to step S22.

On the other hand, when it is determined that all the batteries 2a to 2c reach the discharge end voltage (Y in step S25), the control unit 6 stops the discharging (step S27). Thereafter, the control unit 6 turns off all the first switches SW1a to SW1c and all the second switches SW2a to SW2c (step S28), then turns on all the first switches SW1a to SW1c (step S29), and ends the processing.

A rate of decrease of the voltages at the two ends during discharging is higher for the batteries 2a to 2c which are deteriorated, and the discharge end voltage thereof is reached soon even if the batteries 2a to 2c are discharged with the same current. For example, when the batteries are deteriorated in an order of 2c, 2b, 2a, the most deteriorated battery 2a reaches the discharge end voltage Vda=2.8V first. Therefore, according to the above-described operation, the control unit 6 first turns off the first switch SW1a corresponding to the battery 2a, turns on the second switch SW2a (FIG. 4C), and bypasses the battery 2a.

Thereafter, the second deteriorated battery 2b reaches the discharge end voltage Vdb=2.7V. Therefore, according to the above-described operation, the control unit 6 turns off the first switch SW1b corresponding to the battery 2b next, turns on the second switch SW2b (FIG. 4D), and bypasses the battery 2b.

Thereafter, the battery 2c which is the least deteriorated reaches the discharge end voltage Vdc=2.6V. According to the above-described operation, the control unit 6 turns off all the switches SW1a to SW1c, SW2a to SW2c (FIG. 4A), and stops the discharging.

As described above, although the deterioration of the batteries 2a to 2c can be restrained as the charge end voltage is set to be low, since a depth of discharge (DOD) becomes shallow, capacity of the batteries cannot be entirely consumed. On the other hand, although the deterioration of the batteries 2a to 2c cannot be restrained as the charge end voltage is set to be high, since the DOD becomes deep, the capacity of the batteries can be entirely consumed. According to the embodiment described above, the control unit 6 changes the charge end voltage such that the charge end voltage for the batteries 2a to 2c which are deteriorated becomes lower.

As a result, the DOD of the batteries 2a to 2c which are deteriorated can be reduced to restrain the deterioration, thus variations of deterioration of the plurality of batteries 2a to 2c can be restrained. The batteries 2a to 2c which are not deteriorated have a deeper DOD, so that the capacity of the batteries can be effectively consumed.

Although the deterioration of the batteries 2a to 2c can be restrained as the discharge end voltage is set to be high, since the DOD becomes shallow, the capacity of the batteries cannot be entirely consumed. On the other hand, although the deterioration of the batteries 2a to 2c cannot be restrained as the discharge end voltage is set to be low, since the DOD becomes deep, the capacity of the batteries can be entirely consumed. According to the embodiment described above, the control unit 6 changes the discharge end voltage such that the discharge end voltage for the batteries 2a to 2c which are deteriorated becomes higher.

As a result, as in the case of charging, the DOD of the batteries 2a to 2c which are deteriorated can be reduced to restrain the deterioration, thus the variations of deterioration of the plurality of batteries 2a to 2c can be restrained. The batteries 2a to 2c which are not deteriorated have a deeper DOD, so that the capacity of the batteries can be effectively consumed.

According to the embodiment described above, the control unit 6 changes both the charge end voltage and the discharge end voltage. As a result, a range of variation of a range between the charge end voltage and the discharge end voltage can be increased, the deterioration of the batteries 2a to 2c which are deteriorated can be further restrained, and the battery capacity of the batteries which are not deteriorated can be more effectively used.

According to the embodiment described above, the control unit 6 can accurately determine the deterioration state of the battery by separately determining the charge deterioration state of the battery and the discharge deterioration state.

The present invention is not limited to the above-described embodiment and may be appropriately modified, improved, or the like. Materials, shapes, sizes, numbers, arrangement positions, and the like of constituent elements in the embodiment described above are optional as long as the present invention can be achieved, and the present invention is not limited thereto.

Although the control unit 6 changes both the charge end voltage and the discharge end voltage according to the embodiment described above, the present invention is not limited thereto. The control unit 6 may change only one of the charge end voltage or the discharge end voltage.

Further, although the control unit 6 determines by separating the charge deterioration state and the discharge deterioration state according to the embodiment described above, the present invention is not limited thereto. For example, when determining a discharge deterioration from internal resistances of batteries 2a to 2c, it is not necessary to separate discharge deterioration and charge deterioration.

Although the switching units 4a to 4c include the first switches SW1a to SW1c and the second switches SW2a to SW2c according to the embodiment described above, the present invention is not limited thereto. The switching units 4a to 4c may include a switching switch that selects one of the batteries 2a to 2c or a bypass circuit connected in parallel to the batteries 2a to 2c.

Characteristics of the current control unit and the battery system according to the present invention are briefly summarized in the following [1] to [4].

[1]
A battery control unit (3) includes: switching units (4a to 4c) provided for each of a plurality of batteries (2a to 2c) arranged in series, the switching units (4a to 4c) being configured to switch between a connected state where the corresponding batteries (2a to 2c) are connected in series with the other batteries (2a to 2c) and a non-connected state where series connection between the corresponding batteries (2a to 2c) and the other batteries (2a to 2c) are disconnected; and a control unit (6) configured to control the switching units (4a to 4c) corresponding to the batteries (2a to 2c) to switch to the non-connected state when it is determined that the corresponding batteries (2a to 2c) reach a charge end voltage during charging or a discharge end voltage during discharging. The control unit (6) changes the charge end voltage or the discharge end voltage for each of the plurality of batteries (2a to 2c) in accordance with a deterioration state of the plurality of batteries (2a to 2c).

[2]
In the battery control unit (3) according to [1], the control unit (6) changes both the charge end voltage and the discharge end voltage for each of the plurality of batteries (2a to 2c) in accordance with the deterioration state of the plurality of batteries (2a to 2c).

[3]
In the battery control unit (3) according to [1] or [2], the control unit (6) determines a charge deterioration state or a discharge deterioration state of the batteries (2a to 2c) and changes the charge end voltage or the discharge end voltage in accordance with the charge deterioration state or the discharge deterioration state.

[4]
A battery system (1) includes: a plurality of batteries; and the battery control unit (3) according to any one of [1] to [3].

What is claimed is:

1. A battery control unit comprising:
   a switching unit provided for each of a plurality of batteries arranged in series, and configured to switch between a connected state where the corresponding battery is connected in series with another battery and a non-connected state where series connection between the corresponding battery and the other battery is disconnected; and
   a control unit configured to control the switching unit corresponding to the battery to switch to the non-connected state when it is determined that the corresponding battery reaches a respective charge end voltage during charging or a respective discharge end voltage during discharging,
   wherein the control unit selects the respective charge end voltage from a plurality of predetermined charge end voltages or selects the respective discharge end voltage from a plurality of predetermined discharge end voltages for each of the plurality of batteries in accordance with a respective deterioration state of each of the plurality of batteries, and
   the control unit selects both the respective charge end voltage and the respective discharge end voltage for each of the plurality of batteries in accordance with the respective deterioration state of each of the plurality of batteries, and
   during charging, the control unit determines whether each of the plurality of batteries has reached the selected respective charge end voltage, individually, and controls the switching unit corresponding to the battery to switch to the non-connected state when it is determined that the corresponding battery reaches the selected respective charge end voltage, and during discharging, the control unit determines whether each of the plurality of batteries has reached the selected respective discharge end voltage, individually, and controls the switching unit corresponding to the battery to switch to the non-connected state when it is determined that the corresponding battery reaches the selected respective discharge end voltage, and the controller determines the respective deterioration state based on a change of a respective voltage measured at two ends of the respective battery caused by charging, and the controller determines the respective deterioration state based on a change of the respective voltage measured at the two ends of the respective battery caused by discharging.

2. The battery control unit according to claim 1, wherein the control unit determines a respective charge deterioration state at a negative pole of each of the batteries or a respective discharge deterioration state at a positive pole of each of the batteries, and changes the respective charge end voltage or the respective discharge end voltage in accordance with the respective charge deterioration state or the respective discharge deterioration state.

3. A battery system comprising:

a plurality of batteries; and the battery control unit according to claim 1.

4. The battery control unit according to claim 1, wherein the plurality of charge end voltages includes a high charge end voltage, a medium charge end voltage that is less than the high charge end voltage, and a low charge end voltage that is less than the medium charge end voltage.

\* \* \* \* \*